United States Patent [19]

Hennig et al.

[11] Patent Number: 5,199,926
[45] Date of Patent: Apr. 6, 1993

[54] TELESCOPIC COVER

[75] Inventors: Kurt Hennig; Albert Stöhr, both of Bundesrepublik Deutschland, Fed. Rep. of Germany

[73] Assignee: Gebr. Hennig GmbH, Ismaning, Fed. Rep. of Germany

[21] Appl. No.: 789,625

[22] Filed: Nov. 12, 1991

Related U.S. Application Data

[63] Continuation of Ser. No. 439,043, Oct. 27, 1989, which is a continuation of PCT/EP89/00244 filed Mar. 8, 1989, abandoned.

[51] Int. Cl.$^5$ ............................................. F16D 3/84
[52] U.S. Cl. ................................... 464/170; 464/172; 160/222
[58] Field of Search ............... 464/170, 172; 74/608, 74/609; 160/202, 211, 216, 222

[56] References Cited

U.S. PATENT DOCUMENTS

| | | | |
|---|---|---|---|
| 2,613,060 | 10/1952 | Trahan | 464/162 X |
| 3,429,356 | 2/1969 | Loos | 160/223 |
| 3,543,536 | 12/1970 | Rekow | 464/172 X |
| 3,570,578 | 3/1971 | Loos | 160/222 X |
| 3,603,651 | 9/1971 | Weber | 74/608 X |
| 3,691,588 | 9/1972 | Hennig et al. | 160/202 X |
| 3,960,196 | 6/1976 | Berner | 160/222 |

FOREIGN PATENT DOCUMENTS

| | | |
|---|---|---|
| 122252 | 1/1901 | Fed. Rep. of Germany . |
| 3711146 | 10/1988 | Fed. Rep. of Germany . |
| 3711147 | 10/1988 | Fed. Rep. of Germany . |
| 2428189 | 1/1980 | France . |
| 135462 | 5/1979 | German Democratic Rep. . |
| 460461 | 9/1968 | Switzerland . |
| 571629 | 9/1945 | United Kingdom . |
| 1073939 | 6/1967 | United Kingdom . |

Primary Examiner—Daniel P. Stodola
Assistant Examiner—William G Battista, Jr.
Attorney, Agent, or Firm—Hopkins & Thomas

[57] ABSTRACT

A telescopic cover element is made from a sheet material blank and has one U-shaped material deformation formed from multiple bends for receiving a rear partion wall/or providing an extension stop. A second U-shaped material deformation formed from multiple bends opens towards the exterior of the cover element to form a discharge channel.

5 Claims, 9 Drawing Sheets

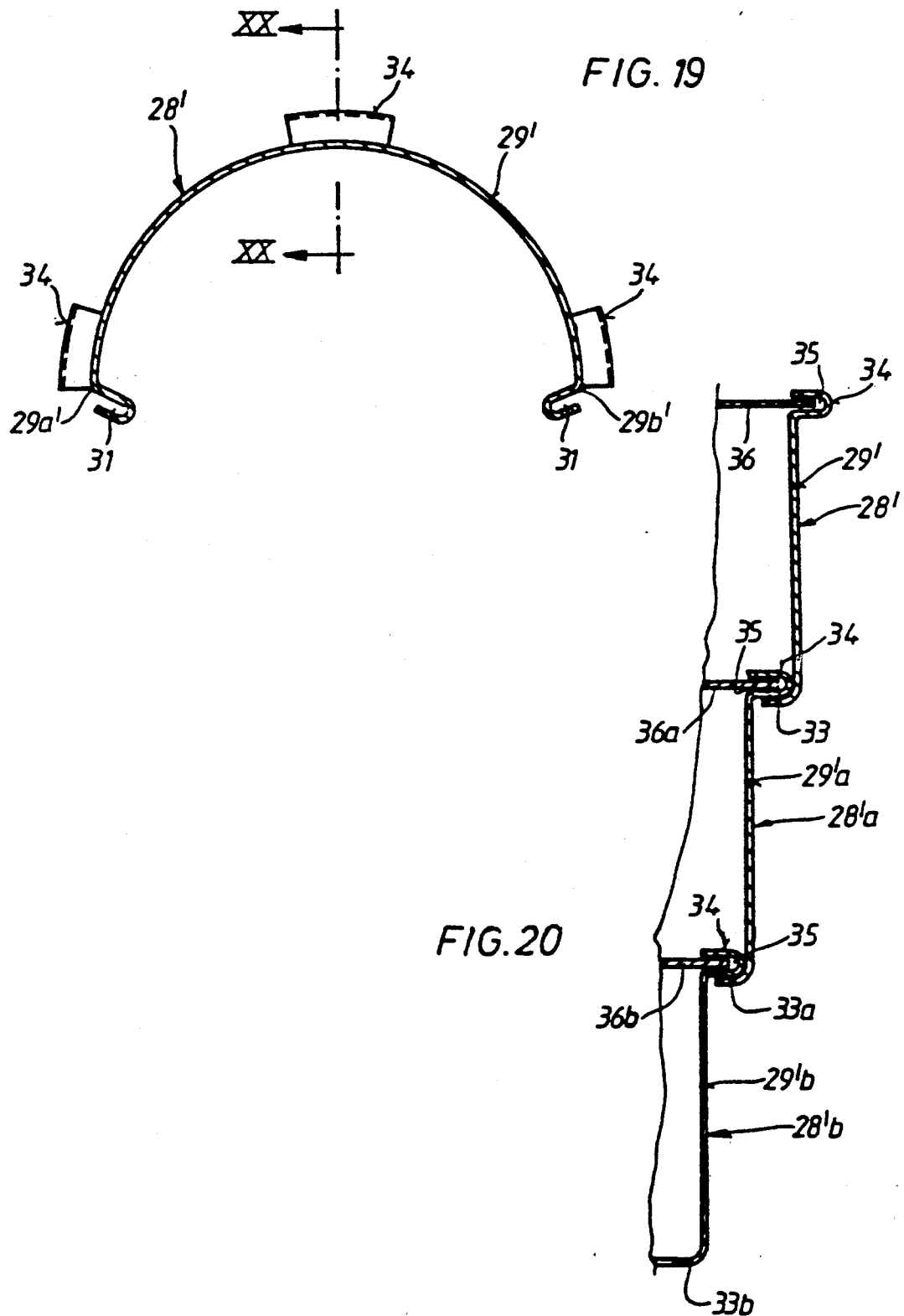

TELESCOPIC COVER

This is a continuation of copending application(s) Ser. No. 07/439,043 filed on Oct 27, 1989, which is a continuation of PCT/EP89/00244 filed Aug. 8, 1989, now abandoned.

BACKGROUND OF THE INVENTION

The invention relates to a telescopic cover for protection of machine tools and other industrial equipment.

A telescopic cover is known, for example from the subject matter of West German Patent Specification DE-A-37 11 147. In this disclosure, the top wall and the side walls of the individual cover elements are produced by bending a single sheet material blank, so that the top wall and the side walls have inwardly directed bends on the front edge of the cover element and outwardly directed bends on the rear edge.

The individual cover elements of such telescopic covers must frequently be provided with rear walls, scrapers, slides and channels, which in the known constructions often involves complicated production and assembly.

SUMMARY OF THE INVENTION

The object of the invention, therefore, is to construct a telescopic cover in such a way that the production and assembly are simplified and the cover elements have a high degree of rigidity and stability even when a reduced wall thickness is chosen.

According to the invention at least some individual cover elements have at least one rib-like material deformation which is U-shaped in cross-section. This material deformation can serve for example for fixing a rear wall, a scraper and/or a slide. It can also form a channel for the removal of fluid, shavings and the other materials. In addition it can serve for longitudinal and/or transverse reinforcement of the cover element (either exclusively or in addition to one of the aforementioned functions). Furthermore, this rib-like material deformation with the U-shaped cross-section can also form a closure element for a cover which is divided in cross-section.

BRIEF DESCRIPTION OF THE DRAWINGS

Some embodiments of the invention are illustrated in the drawings, in which:

FIG. 19 shows a cross-sectional view of a cover half shell of a variant of the cover element according to FIG. 18;

FIG. 20 shows a partial longitudinal sectional view along the line XX—XX in FIG. 19.

DETAILED DESCRIPTION

Figure 1:
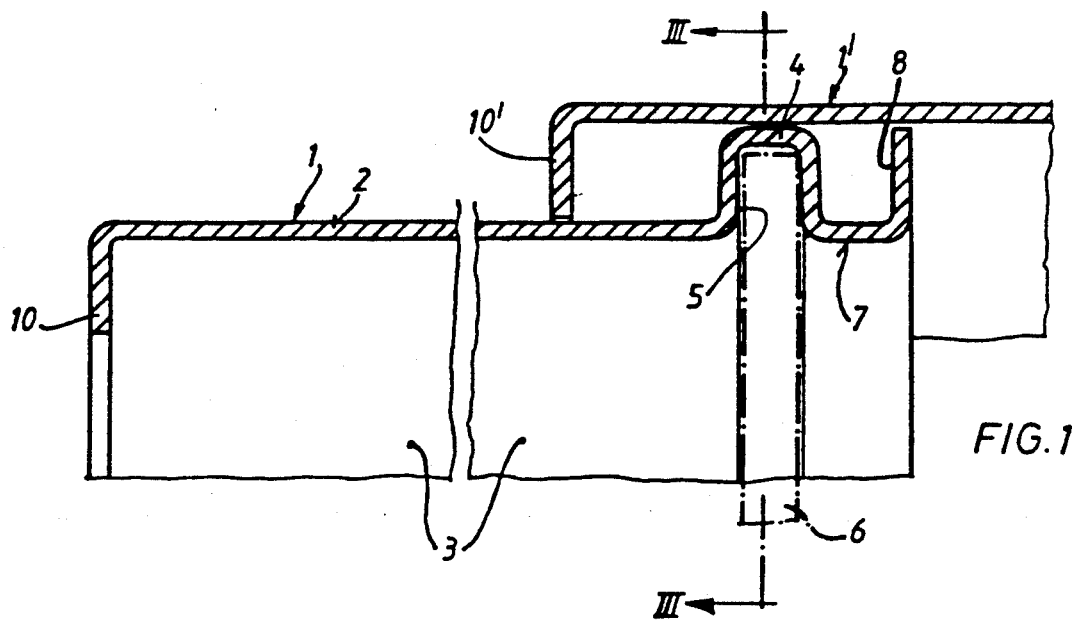
FIG. 1 shows a partial longitudinal sectional view through a first embodiment of the telescopic cover.

FIG. 1 shows a first embodiment of the telescopic cover which is used in particular as a protective cover for guideways of machine tools and for this purpose can be adapted appropriately to these guideways. Two cover elements which are built telescopically into one another are shown—to a greater or lesser extent—in FIG. 1 in the form of cover boxes 1, 1' of this telescopic cover which are of substantially similar construction. Naturally, any number of such cover boxes can be assembled in adaptation to the guideways to be protected. Each of these cover boxes 1, 1', which are movable in the longitudinal direction with respect to one another, can cover a corresponding longitudinal section of a guideway which is not shown in greater detail and can engage around the latter like a box in the transverse direction in the required manner.

Since each of these cover boxes 1, 1' is of similar construction it is sufficient to describe the cover box 1 in detail. This cover box 1 has a top wall 2 as well as two side walls which extend parallel and are bent approximately at right angles thereto.

In this partial longitudinal section view according to FIG. 1 the cover box 1 (just like all other appertaining cover boxes)—when viewed in the longitudinal direction of the telescopic cover or of the cover boxes—has on one end section a first U-shaped material deformation 4 which runs at right angles to the longitudinal direction and which in the present case extends over the entire top wall 2 and the two side walls 3, projecting outwards from the upper face of the top wall 2 and the side walls 3. The channel 5 thus formed is open towards the interior of the cover element 1, and it serves to receive a rear wall 6, which is merely indicated by dash-dot lines, for this cover box 1 (optionally with the provision of a sealing zone).

Immediately adjoining the first material deformation 4, a second material deformation 7 which is rib-like and U-shaped in cross-section is also provided on this end section of the cover box 1 and can also be constructed so as to form a second open channel 8, this second material deformation 7 thus forming the end closure of this cover box 1 at the end. Both material deformations 4 and 7 can have approximately the same or also different channel cross-sections and can extend parallel to one another transversely over the top wall 2 and the two side walls 3, but the second channel formed by the second material deformation 7 is open towards the exterior. This second channel 8 can serve for removal of fluid, shavings and the like, but if necessary can also serve to receive scraper and/or slide elements.

If required, a further U-shaped material deformation running at right angles to the longitudinal direction of the cover box 1 can be provided in a suitable manner on the second cover box end section which lies opposite the first section with the two material deformations 4 and 7.

In the present embodiment a bend in the form of a flange 10 or 10' can be provided on the outermost end of this second end section of the cover box 1, 1' (and similarly on the further cover boxes) in such a way that the flange 10, 10' runs at right angles to the longitudinal direction of the cover box and can extend at least over the entire width of the top wall 2, but preferably also over the entire height of the side walls 3. These end flanges 10, 10' can serves as a closure for the end, to receive slides or sealing elements or also as end stops, in co-operation with U-shaped material deformations projecting in each case from the upper face on the first end of the cover box lying thereunder, as can be easily seen for example from FIG. 1 (co-operation for instance of the flange 10' of the cover box 1' with the material deformation 4 of the cover box 1 lying beneath it).

All material deformations which are U-shaped in cross-section can preferably be formed by a multiple bend (as shown).

The first embodiment of the cover boxes 1, 1' or of the telescopic cover as already explained with the aid of FIG. 1 is particularly suitable for assembling the telescopic cover when the individual cover boxes 1, 1' are to be pushed into one another from the rear, i.e. from the first end sections (with the two material deformations 4 and 7).

A second embodiment will be explained with the aid of a cover box 13 shown in a partial longitudinal sectional view in FIG. 2. This cover box 13 can consist, as in the first embodiment, of a top wall 14 and two side walls 15 bent approximately at right angles thereto.

In this case two U-shaped material deformations which immediately adjoin each other and run at right angles to the longitudinal direction are again provided on the rearward first end section of the cover box 13, namely a first material deformation 16 and a second material deformation 17, each forming an open channel, namely a first channel 18 and a second channel 19 respectively. Of these, the first material deformation 16 projects into the interior of the cover box 13 and has a first channel 18 which is open towards the outside, whilst the second material deformation 17 provided immediately on the end projects towards the outside of the cover box 13 and has a second channel 19 which is open towards the interior of the cover box. In this case the second material deformation 17 or its second channel 19 can serve to receive a rear wall 6 which is only indicated by dash-dot lines, whilst the first channel 18 of the first material deformation 16 lies further inside and again can serve as a discharge channel for fluid and shavings.

The second end section of this cover box 13 opposite the first end section with the two material deformations 16 and 17 preferably extends in a straight line, i.e. it is constructed without any material deformation. However, if required a suitable scraper, for example a C-shaped scraper which is known per se with a buffer or the like, can be fixed on this straight end section.

Figure 2:
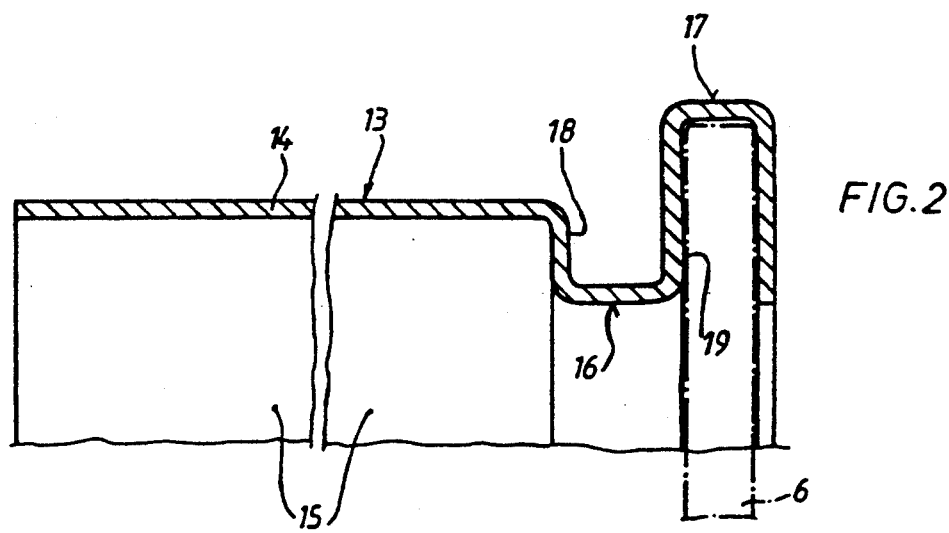
FIG. 2 shows a partial longitudinal sectional view through a cover element of a second embodiment of the telescopic cover.

This embodiment of a cover box 13 shown in FIG. 2 is particularly suitable for telescopic covers in which the individual cover boxes are to be fixed into one another from the front, that is to say from the straight second end section.

Figure 3:
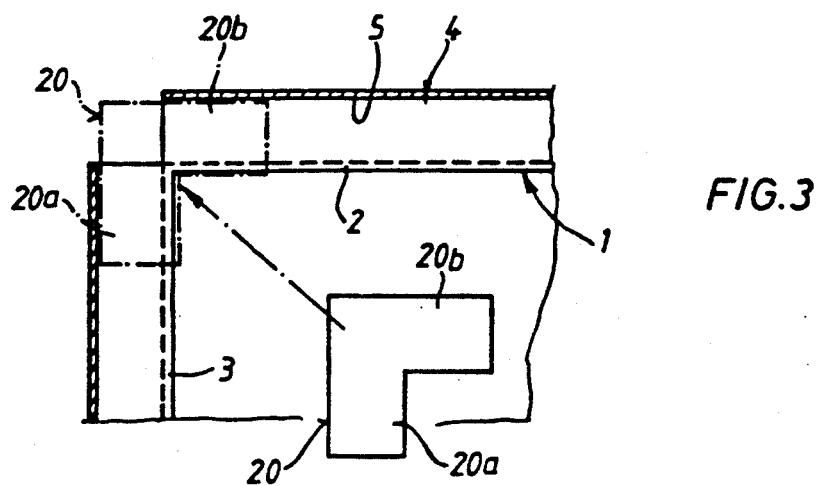
FIG. 3 shows a partial cross-sectional view (approximately along the line III—III in FIG. 1) to explain another embodiment of the cover elements.

With the aid of FIG. 3, which shows a variant, for instance of FIG. 1, it will be explained how a cover box can be especially sealed and reinforced in the region of its corners. For the sake of simplicity it may be assumed that in this FIG. 3 the cover box 1 according to FIG. 1 is illustrated in a partial cross-sectional view in the region of the first material deformation 4. The channel 5 which is formed by the first U-shaped material deformation 4 and is open towards the interior of the cover element 1 does not serve in this case—as in FIG. 1—to receive a rear wall, but an angle plate 20 is to be placed in each of the corner regions between the top wall 2 and the adjoining side walls 3. This angle plate has a thickness which corresponds approximately to the internal width of the first channel 5, and it has two flanks 20a and 20b which are of substantially the same length and of which one flank 20b is received so that it fits in the top wall section of the first channel 5 and the other flank 20a is received so that it fits in the side wall section of the first channel 5, as shown by dash-dot lines in FIG. 3. This angle plate 20 can be fixed with its flanks 20a and 20b in the corresponding sections of the first channel 5 by welding or simply by clamping it in. Whereas the first type of fixing provides both reliable sealing and good reinforcement of the cover box 1, the second type of fixing of the angle plate 20 (clamping) essentially only leads to sealing of the cover box 1.

Furthermore, it goes without saying that the fitting of such an angle plate 20 can also be used in other suitable constructions of the material deformations, for example in the second material deformation 17 according to FIG. 2, and it also goes without saying that—by contrast with FIGS. 1 and 2—two material deformations which immediately adjoin one another or extend transversely spaced from one another can both form channels which are open towards the interior, a rear wall can be received in the channel in one material deformation and a corner connection like the angle plates 20 can be received in the channel of the other material deformation.

It should be mentioned at this point that if required at least some cover boxes of the telescopic cover can have in the top wall at least one further U-shaped material deformation, for instance as a longitudinal reinforcing rib, running in the longitudinal direction of the telescopic cover. Because it is easy to imagine such a longitudinally extending U-shaped material deformation, it is not shown in detail in the drawing; it can be provided both in the region of the centre of the length of the top wall and in the side region of the top wall in such a manner as to provide a good fit in each case.

With the aid of FIGS. 4-17 it will be explained with the aid of several examples how each cover element can be constructed for instance in the form of a trough extending in the longitudinal direction of the telescopic cover and can be produced from one single sheet material blank with a top wall and two side walls bent at an angle to the top wall. For the sake of simplicity it should be assumed in each case that a U-shaped material deformation which is constructed by multiple bending and is also produced from this single sheet material blank by multiple bending is provided only on one end section, namely in each case on the immediate end of the appertaining cover box.

First of all a first example of the production of a single cover element 41, designated as a cover box, will be explained with the aid of FIGS. 4-6.

Figure 4:
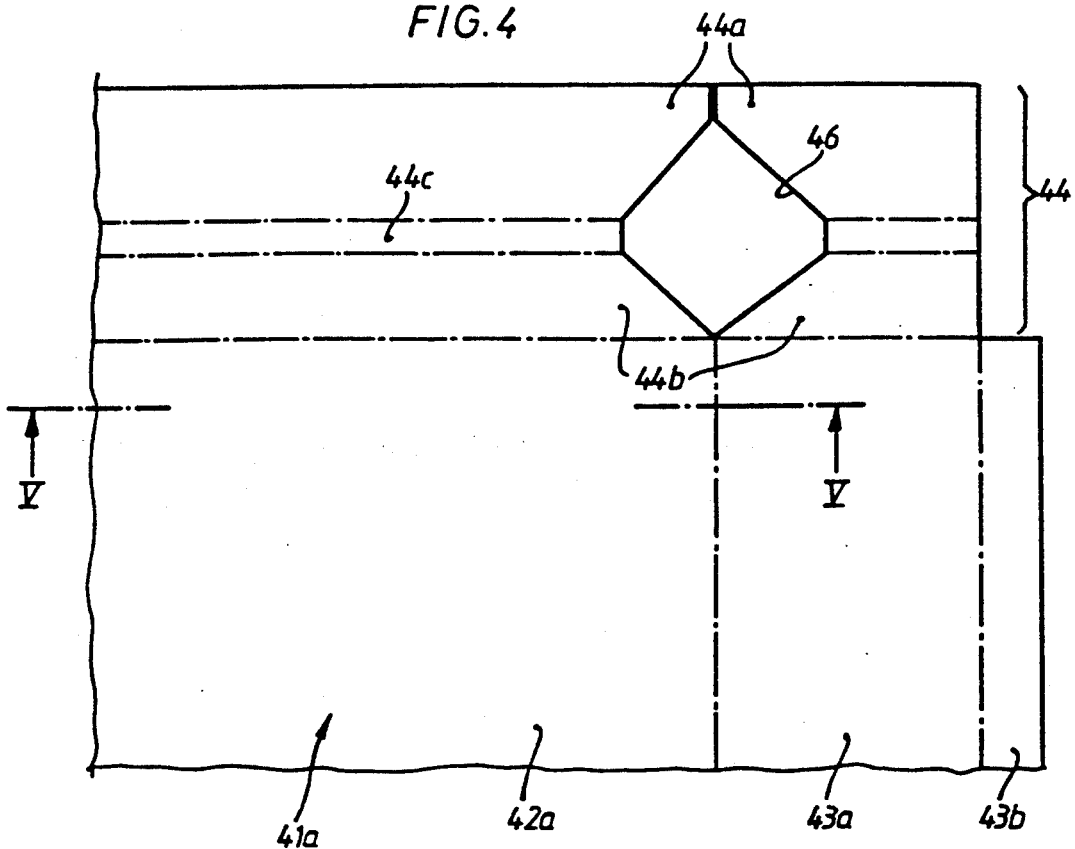
FIG. 4 shows a partial plan view of a rough sheet material blank prepared for bending for a cover element with a U-shaped material deformation at the end.
Figure 5:
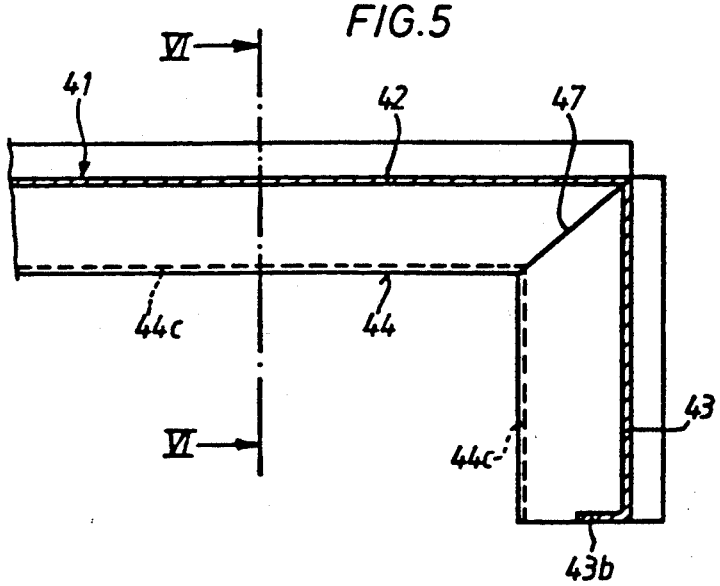
FIGS. 5 and 6 show partial sectional views of the cover element produced from the rough sheet material blank shown in FIG. 4, approximately along the lines V—V in FIG. 4 and VI—VI in FIG. 5 respectively.
Figure 6:
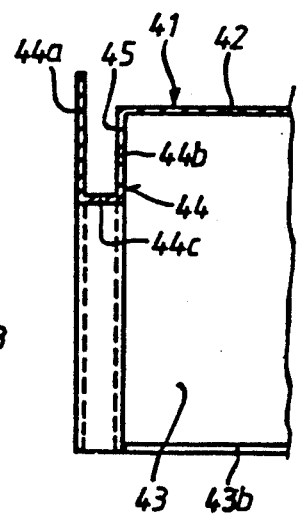

As the partial sectional views in FIGS. 5 and 6 show, the cover box 41 which is produced by multiple bending has a top wall 42 and two side walls 43 (of which only one is shown) as well as a U-shaped material deformation 44 which is constructed at the end and runs at right angles to the longitudinal direction of the cover box. This material deformation 44 projects into the interior of the cover box 41 and forms a channel 45 which in this example extends continuously over the entire top wall 42 and the two side walls 43. The outermost front face of this cover box 41 is formed by the outer flange-like section 44a of the material deformation 44 which extends upwards and laterally over the plane of the top wall 42 or the side walls 43, as can be seen in FIGS. 4 and 5.

FIG. 4 shows the plan view of the unbent cover box 41 (according to FIGS. 5 and 6), that is to say the rough sheet material blank of this cover box 41. This rough sheet material blank is designated by 41a and is illustrated in FIG. 4 in a state shortly before the bending is carried out to shape it into the cover box 41, that is to say the bend lines are shown by dash-dot lines and the cut or cut-out edges are shown in solid lines. With reference to the representations of the finished cover box 41 in FIGS. 5 and 6, the sheet material blank 41a of FIG. 4 therefore contains the following sections: the top wall section 42a, one of the side wall sections 43a with an additional section for bending 43b (to engage under a guideway or the like; in this connection see also FIGS. 5 and 6) as well as the section extending over the sections 42a and 43a for the material deformation 44 to be formed with the raised section 44a, the inner section 44b and the channel base 44c to be formed.

In the region of the end section of the rough sheet material blank 41a which is to form the U-shaped material deformation 44 a cut-out 46 is provided of such a shape and size that after all of the bends have been produced at least some of the cut-out edges butt against one another to form a corner connection 47.

In this connection if one considers the sheet material blank 41a in FIG. 4 in concrete terms, then in each transition region from the top wall 42 or 42a to one of the side walls 43 or 43a of the material deformation 44 to be formed the rough sheet material blank 41a has a material cut-out 46 which is adapted to the shape and the channel 45 and in which in each case correspondingly opposing cut-out edges (in FIG. 4) butt against one another as shown at 47 after the necessary bends have been produced (and are advantageously welded together in this state). In this way the shape and size of the cut-out 46 according to FIG. 4 result in a cover box 41 according to FIGS. 5 and 6 formed by multiple bends, and FIG. 5 shows that the finished U-shaped material deformation 44 in the transition region from the top wall 42 to the side walls 43 has a corner connection 47 in which the corresponding cut-out edges butt against one another on a mitre line, so that the channel 45 which is formed extends uninterrupted (continuously) over the top wall 42 and the two side walls 43.

Figure 7:
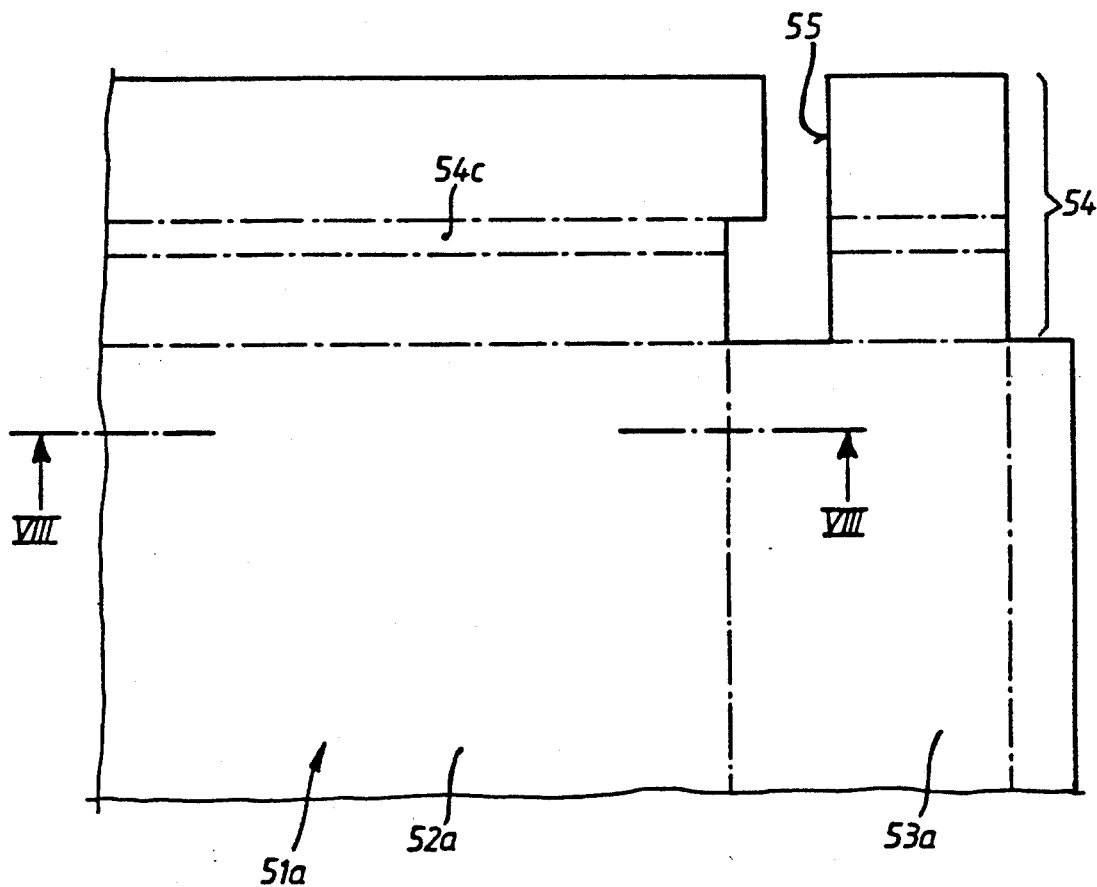
FIG. 7 shows a similar partial plan view of a rough sheet material blank for a variant of the cover element.
Figure 8:
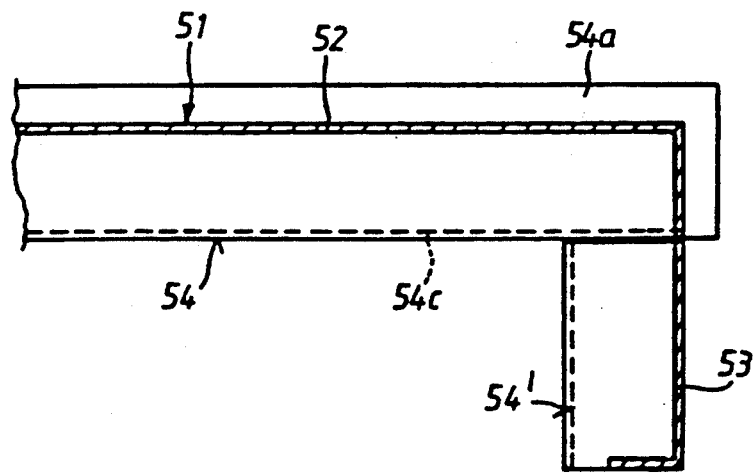
FIG. 8 shows a partial sectional view (approximately along the line VII—VII in FIG. 7) of the cover element produced from the sheet material blank according to FIG. 7.

For a second example of producing a cover box 51, FIG. 7 in turn shows the rough sheet material blank 51a prepared for the subsequent multiple bending and FIG. 8 shows a partial cross-sectional view of the finished bent cover box 51. This cover box 51 also has on one end a material deformation 54 which is also U-shaped and which in this case initially extends over the entire top wall 52 and opens through the side walls 53. A channel section 54' which is of equal-sized cross-section and formed by the material deformation 54 is constructed on each of the two side walls 53 of this cover box 51, as in the top wall 52. The channel sections 54' in the two side walls 53 then butt—as can be seen in FIG. 8—against the underside of the channel base 54c of the channel section provided in the top wall 52. The cross-section of this U-shaped material deformation 54 can be of exactly the same construction as the material deformation 44 in FIG. 6, that is to say also with an outer section 54a extending outwards over the planes of the top wall 52 and the side walls 53.

In this embodiment of the cover box 51 as shown in FIG. 8, in order to be able to take full account in the single sheet material blank 51a according to FIG. 7 of all bends and thus also of the necessary corner connection in the transition region from the top wall 42 to the corresponding side walls 53 at the U-shaped material deformation 54, a material cut-out 51 which is adapted in shape and size is also provided here so that in the finished bent cover box 51 corresponding cut-out edges butt against one another at least partially or—above all here—can form an advantageous support for corresponding material deformation parts.

Figure 9:
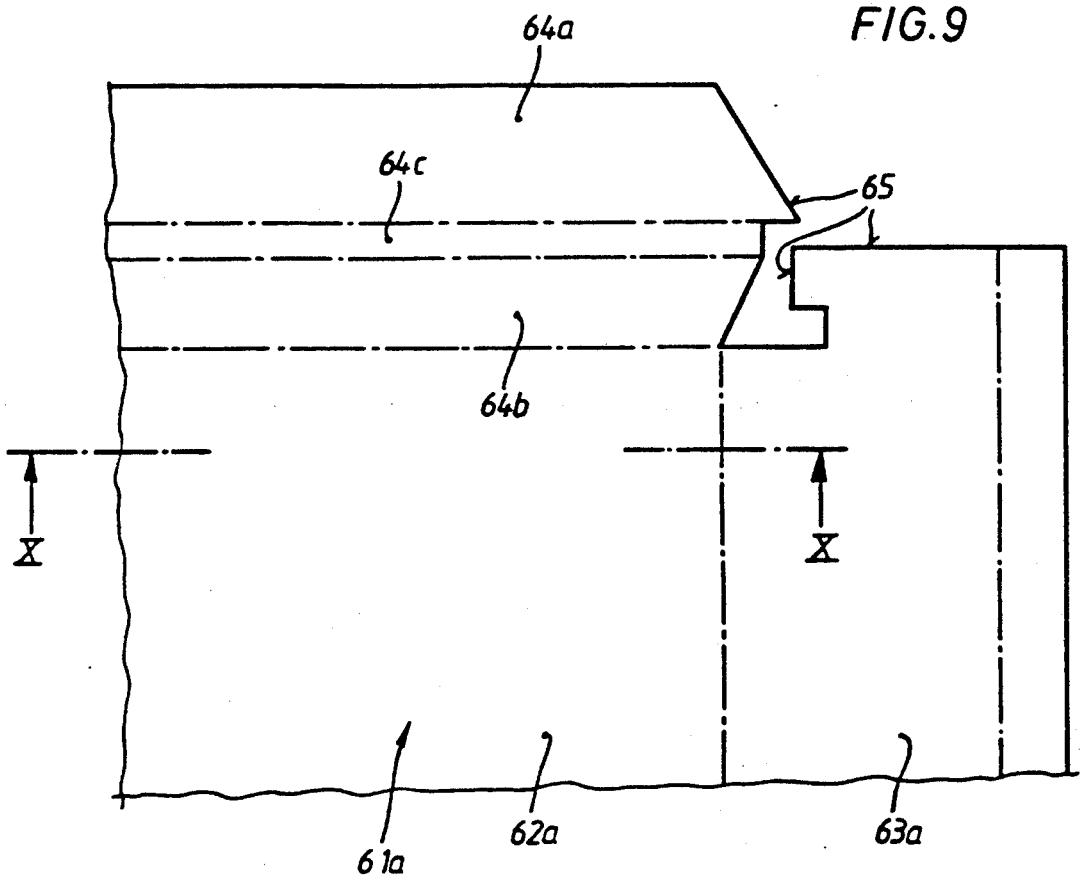
FIG. 9 shows a partial plan view of another rough sheet material blank for a further variant of a cover element.
Figure 10:
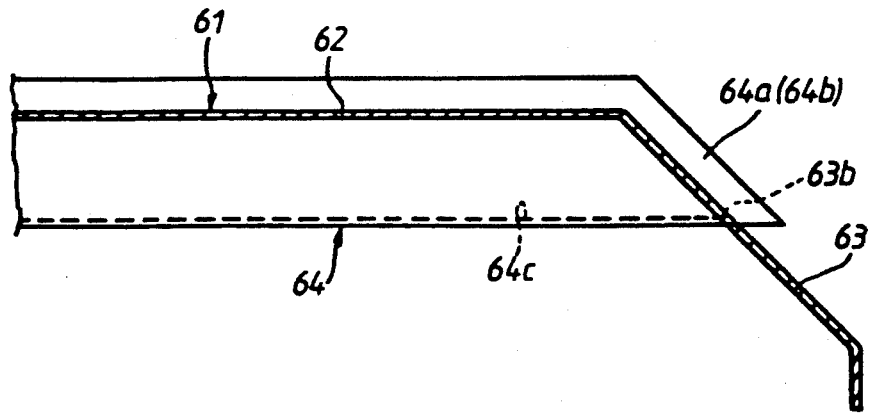
FIG. 10 shows a partial sectional view of the cover element (section along the line X—X in FIG. 9) produced from the sheet material blank shown in FIG. 9.

Whereas in the preceding embodiments the side walls are bent approximately at right angles with respect to the top walls of the respective cover box, FIGS. 9 and 10 show an example of a further cover box 61 in which at least one side wall 63 is bent so that it is inclined with respect to the to wall 62, i.e. in the illustration of the finished cover box 61 according to FIG. 10 the side wall 63 is bent downwards out of the plane of the top wall by only about 45° (producing a sort of roof shape in this region between the top wall 62 and the side wall 63).

The rough sheet material blank 41a which is necessary for this is shown in plan view in FIG. 9. The material deformation 64 which is again U-shaped in cross-section (with the same cross-section as for instance FIG. 6) should form a channel which is open towards the exterior but which in the present case only runs transversely over the entire top wall 62 and opens through the side walls 63. The material deformation 64 formed from the side wall sections 64a and 64b as well as the base 64c should be supported at its ends in a correspondingly shaped recess 63b in the side wall or the side walls 63. In order to be able to take account of this from the outset in the production of the rough sheet material blank 61a, the rough sheet material blank 61a again has adapted cut-outs 65 (FIG. 9) in the corresponding transition regions from the top wall blank 62a to the side wall sections 63a or the corner connections of the material deformation 64.

Figure 12:
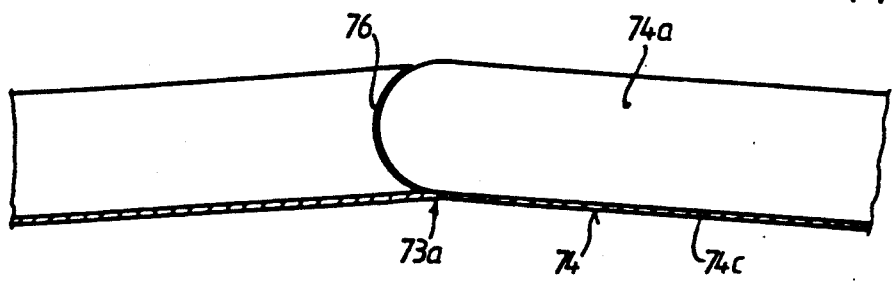
FIGS. 12 and 13 show partial sectional views of the top wall of the finished cover element according to FIG. 11 (along the lines XII—XII and XIII—XIII respectively in FIG. 11)
Figure 11:
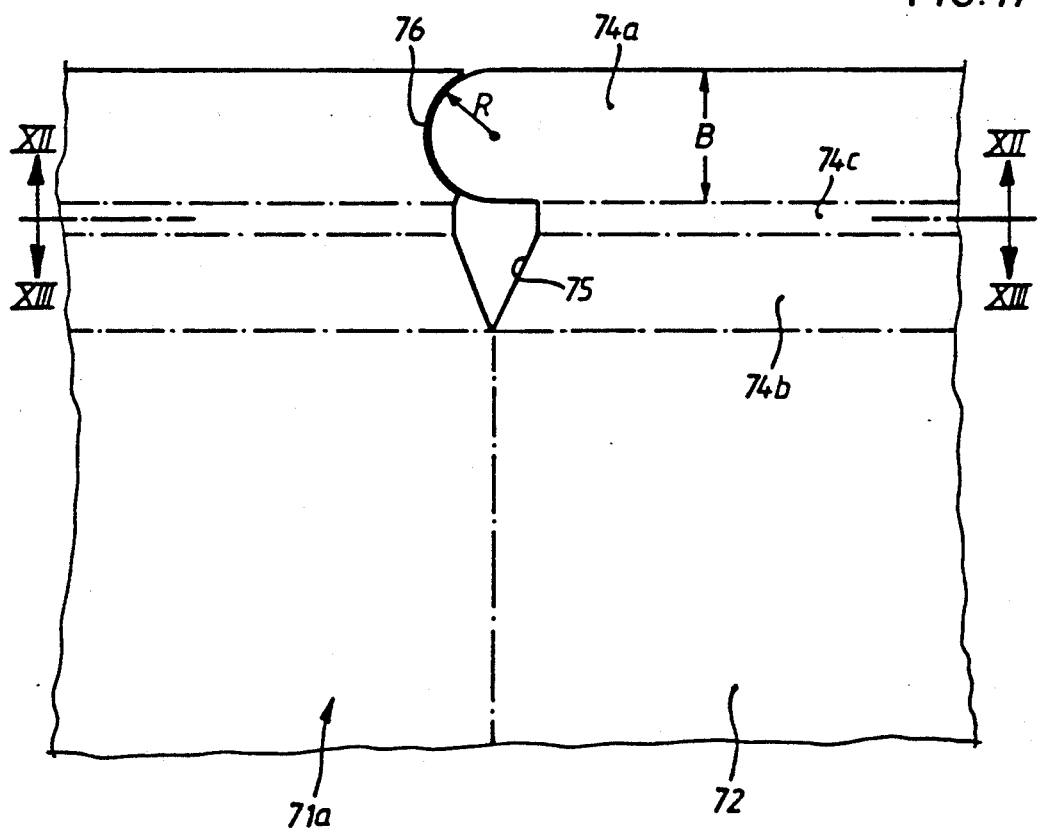
FIG. 11 shows a partial view of a further rough sheet material blank for the production of the top wall of another variant of the cover element.
Figure 13:
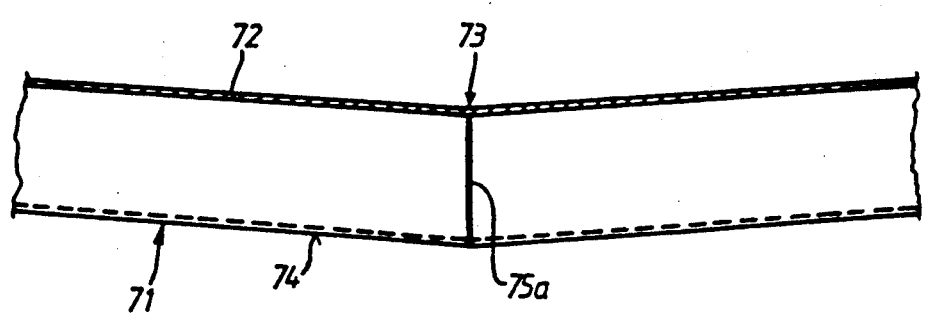

In an unbent plan view and in two partial sections FIGS. 11–13 show in each case only one part of an end section of an additionally deformed top wall 72 of a variant of the cover box 71. A material deformation 74 which is of U-shaped cross-section again runs transversely—with the same shaping as in the previous examples—over this cover box 71 or the illustrated top wall 72. In this case the top wall 72 should have in its central transverse region a ridge-like kink 73 running in the longitudinal direction of the cover or the cover element 71 (cf. cross-sectional view in FIG. 13), and a kink 73a of a similar size should also be provided in the region of the material deformation 74, particularly in the region of its base 74c.

In order also to be able to carry out the aforementioned ridge-like kink 73—at 73a—in a similar fashion in the U-shaped material deformation 74, the rough sheet material blank 71a is provided with a further—as compared with examples 4 to 10—material cut-out 75, which is adapted to the course of the kink of this central channel section, on the end provided for the construction of the U-shaped deformation 74 in the region of the channel to be constructed here. If one considers the rough sheet material blank 71a in FIG. 11, then it will be recognised that the material cut-out 75 is only provided in the central region of the inner side wall section 74b and of the base 74c of the material deformation 74 to be formed. In the central region of the outer side wall section 74a of the material deformation 74 to be formed there is only an approximately semi-circular cut 76 made which has a radius R corresponding to half the width B of the outer side wall section 74a.

If the rough sheet material blank 71a (FIG. 11) which has been prepared in the manner described above is bent appropriately so as to form the ridge-like kink 73, with simultaneous bending and construction of the U-shaped material deformation 74, then the top wall 72 of the finished cover box has the cross-sectional shapes shown in FIGS. 12 and 13, from which it can be seen that the corresponding cut-out edges which lie spaced opposite one another in the rough sheet material blank 71a butt against one another in the finished bent state of the cover box 71 (cf. for example butting edges 75a in FIG. 13). In the central region of the outer side wall section 74a of the material deformation 74 the opposing separating edges are displaced relative to one another only on their peripheral edges, which is possible because of the chosen semi-circular shape of the cut 76, as can be easily seen from a comparison of the representations of this outer side wall section 74a in FIGS. 11 and 12.

With regard to the types of construction of a cover element, which has on one end a single U-shaped material deformation with a channel open towards the exterior, for instance according to the examples of FIGS. 4 to 13, it should also be mentioned that for instance a rear wall to be attached there can for example be fixed flat on the inner side wall section in each case (e.g. 44b in FIG. 6) of the appertaining material deformation; in the same way an inwardly projecting slide element could be attached.

Figure 14:
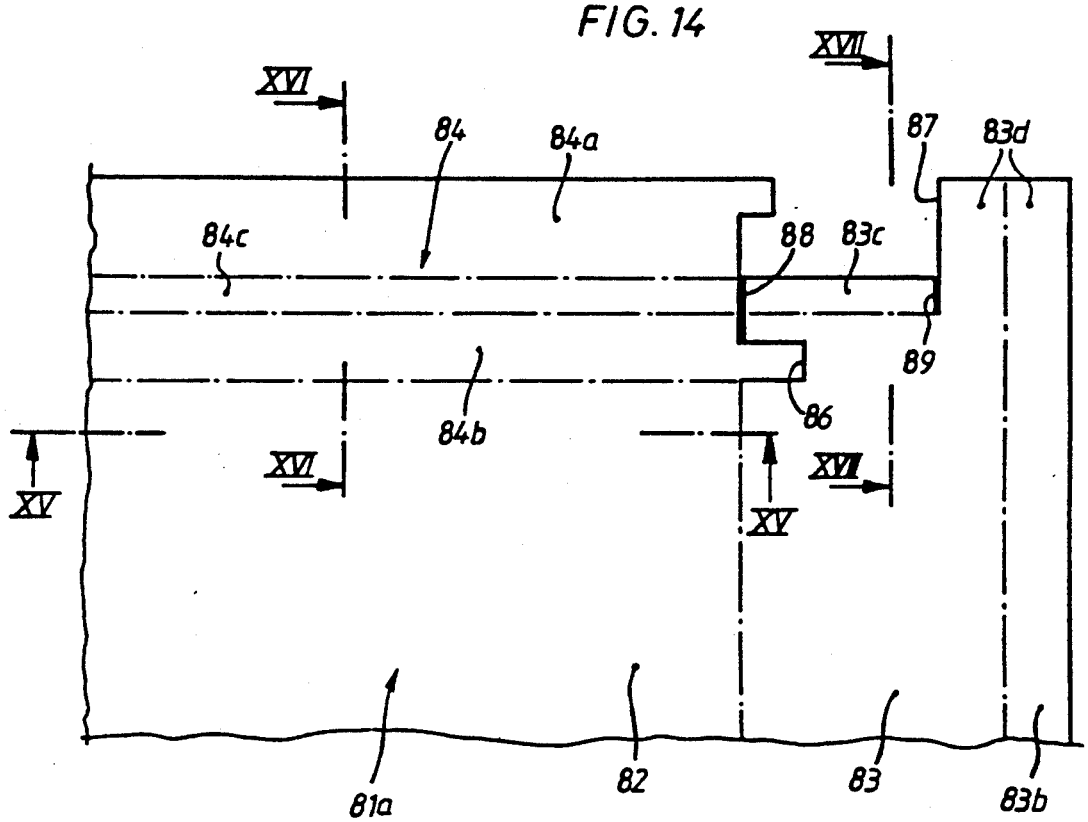
FIG. 14 shows a partial plan view of a rough sheet material blank, prepared for bending, for a further embodiment of a cover element.
Figure 15:
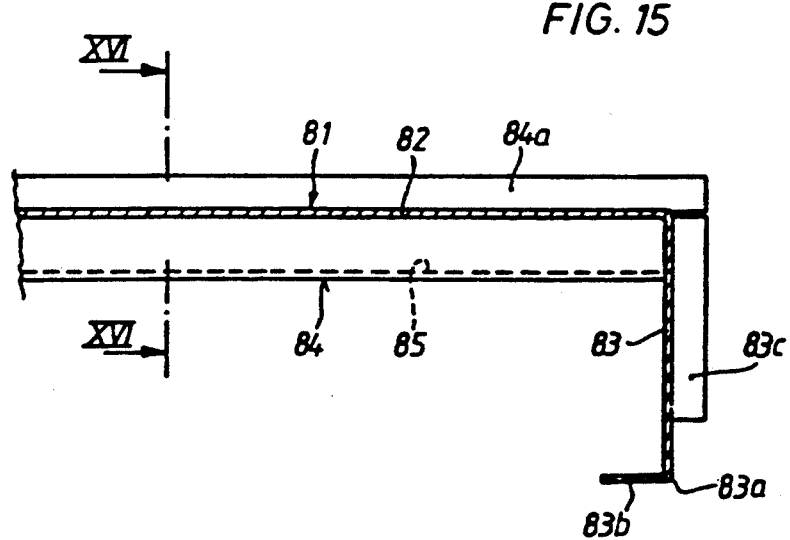
FIG. 15 shows a partial sectional view (approximately along the line XV—XV in FIG. 14) of the finished cover element produced by bending the sheet material blank according to FIG. 14.

A further embodiment of a cover element will be explained first of all with the aid of FIGS. 14 and 15, of which FIG. 14 shows a partial plan view of a rough (unbent) sheet material blank 81a prepared for multiple bending and FIG. 15 shows a corresponding partial cross-section of a cover box (cover element) 81 bent out of this sheet material blank 81a.

Figure 16:
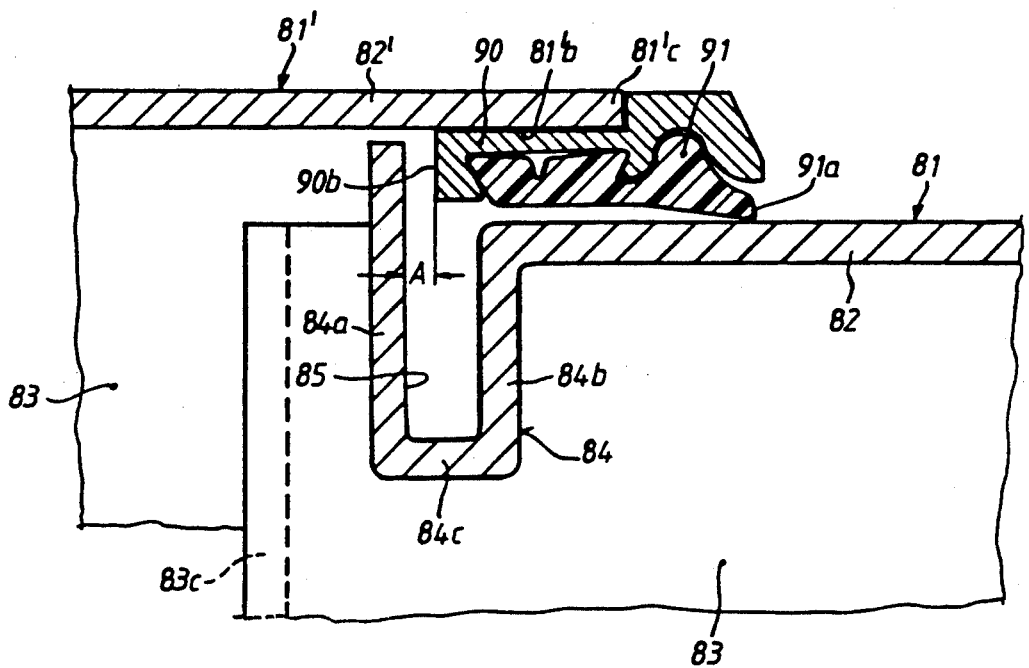
FIGS. 16 and 17 show partial sectional views on an enlarged scale through two finished adjacent cover elements produced with scrapers and stops (sections approximately along the lines XVI—XVI or XVII—XVII in FIG. 14)

This cover box 81 too is constructed in the form of a trough extending in the longitudinal direction of the telescopic cover and is produced from the single sheet material blank 81a by corresponding multiple bending. Thus this cover box 81 in turn has a top wall 82, two side walls 83 (of which only one is shown in FIG. 15, whilst the other is provided in mirror image thereto) which are bent—downwards—at right angles from this top wall 82 and a U-shaped material deformation 84 which is provided on one end of the cover box and projects from the top wall 82 towards the interior of this cover element 81, forms a channel 85 which is open towards the exterior and has a flange 84a which forms the front face at this end of the cover element 81 and—as shown in FIGS. 15 and 16—projects outwards over the top wall 82 of this cover element 81. The two side walls 83 of this cover box 81 have on their lower free edges 83a facing away from the top wall 82 a lower arm 83b which is bent towards the interior of this cover box—preferably at right angles—and can engage under a correspondingly shaped guideway which is not shown here.

On the rear end of this cover box 81 provided with the material deformation 84 the two side walls 83 each have a stop flange 83c which is bent outwards approximately at right angles and the significance of which will be explained later, particularly in connection with FIG. 17.

Figure 17:
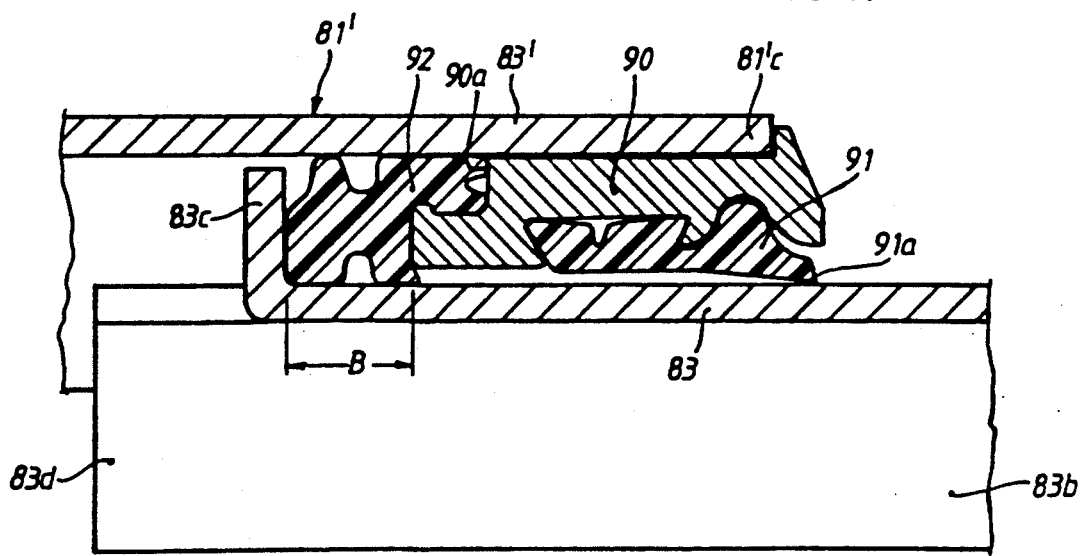

Furthermore, these two side walls 83 of this cover box 81 also have a guide projection 83d, which is indicated in FIG. 17 and can be seen unbent in the rough sheet material blank 81a in FIG. 14, on their ends (which are directed against the direction of extending the telescopic arrangement) provided with the stop flanges 83c and in the region of their lower free edges 83a. Each guide projection 83d extends over only a small part of the height of the appertaining side wall 83, and it is also produced by appropriate angled bending of the rough sheet material blank 81a (each guide projection 83d has approximately the same size and shape as the lower angular section of the side wall 83 below the stop flange 83c, i.e. with the lower arm 83b, as can be seen in FIG. 15).

The cross-sectional shape of the U-shaped material deformation 84 produced by appropriate multiple bending (right-angled bends) can be seen particularly well in FIG. 16. According to this, in addition to the aforementioned flange 84a on the end the material deformation 84 has an inner wall 84b as well as a base 84c which connects the flange 84a and the wall 84b and at the same time forms the closed channel base for the channel 85.

In this embodiment according to FIGS. 14 to 17 the channel 85 formed by the material deformation 84 extends only transversely over the entire width of the top wall 82, opening through each of the side walls 83.

If one again considers the unbent representation of the rough sheet material blank 81a prepared for multiple bending as shown in FIG. 14, then the bend lines shown by dash-dot lines for the multiple bending can be seen, these bend lines in each case defining the walls, flanges, arms etc., of the finished bent cover box 81, and for this reason the sections of this sheet material blank 81a defined by the bend lines in the rough sheet material blank 81a are each provided with the reference numerals which have been used for the corresponding walls, flanges and arms in the finished cover box 81.

In this rough sheet material blank 81a (FIG. 14) it can also be seen that a first material cut-out 86 and a second material cut-out 87 are provided in the transition region from the top wall 82 to a side wall 83 of the cover box 81 which is to be formed as well as in the region of the material deformation 84 which is to be constructed. The first material cut-out 86, which is made directly in the side wall 83, corresponds to the internal cross-section of the channel 85 to be formed by the material deformation 84 and thus to the opening of the channel 85 which opens through this side wall 83.

The second material cut-out 87 is also provided in each side wall 83, but opens towards the end of the side wall 83 in question, so that a through cut 88 is provided between the first material cut-out 86 and the second material cut-out 87 on the respective line of contact between the side wall section and the top wall section in the region of the material deformation 84 to be formed. A second cut 89 lies opposite the first cut 88 in the region of the arm 83d to be formed or of the guide projection 83d to be formed of the side wall 83 and extends only over the width of the stop flange 83c which is to be formed.

A look at the rough sheet material blank 81a which is only shown in partial view in FIG. 14 reveals in the corner region that this rough sheet material blank 81a can be produced from a completely rectangular sheet panel blank with extremely little waste (the two small material cut-outs 86 and 87).

If the rough sheet material blank 81a according to FIG. 14 which is described above and is prepared for multiple bending is compared with the finished bent cover box 81 or the partial section views on an enlarged scale in FIGS. 16 and 17, then on the one hand the ease of producing such a cover box including its U-shaped material deformation 84 as well as the additional lower arm 83b, stop flanges 83c and guide projections 83d can be seen. It will be seen in particular from FIG. 16 that the stop flange 83c on the corresponding end of each side wall 83 projects somewhat in the longitudinal direction of the cover box 81 and in the rearward direction with respect to the flange 84a which at the same time to some extent forms the corresponding end face of the top wall 82. In the same way it can also be seen in FIG. 17 that—as already indicated above—the guide projection 83d of each side wall 83 projects further in the rearward direction with respect to the stop flange 83c.

With this type of prepared sheet material blank 81a (with the cuts-outs 86, 87, the cuts 88, 89 and the bend lines indicated by dash-dot lines) by comparison with the sectional views of the finished bent cover box 81 it is possible in a particularly simple manner to fix accurately in advance both the course and the cross-section of the channel 85 which is to be constructed, the cut-out edges butting against one another after production of the multiple bends at least to some extent forming a weldable corner connection.

It will be explained below, particularly with the aid of FIGS. 16 and 17, how the cover boxes of an entire telescopic cover can be equipped with scrapers and limiting stops for the extending and closing movements of the entire telescopic cover. For this purpose only two co-operating cover boxes which are adjacent to one another are shown in FIGS. 16 and 17 in enlarged partial sectional views and in the fully extended state, and the two cover boxes can be produced in the embodiment previously described with the aid of FIGS. 14 and 15 (and to some extent also FIGS. 16 and 17), so that the smaller cover box is designated by 81 and the next larger cover box which can be pushed telescopically onto it is designated by 81'.

Accordingly, the cover box 81' which is arranged above the smaller (next smaller) cover box 81 has on the underside 81'b of its front end 81'c opposite the material deformation an elastic scraper 91 which is releasably held in a rigid fixing strip 90 and extends transversely over the inner faces of the top wall 82' and—continuous or offset in the longitudinal direction—of the two side walls 83'. This scraper 91 has a scraping lip 91a which projects freely at an angle forwards-downwards and is in sliding contact with the outer faces of the top wall 82 and the corresponding side walls 83 of the smaller cover element 81 so that during the retracting movement of the cover boxes 81, 81' or of the telescopic cover it can scrape off any shavings, dirt or the like adhering to the outer faces of the next smaller cover element. This scraper 91 with its rigid fixing strips 90 are well known and can be used in any suitable construction, so that a further description of these elements is unnecessary.

As can be seen above all in FIG. 17, elastic buffer elements 92 are fixed on the inner faces of the two side walls 83' of the larger (next larger in each case) cover element 81' and directly on the edges 90a of the corresponding sections of the rigid fixing strip 90 opposite the scraping lip 91a. The height of these elastic buffer elements 92 can correspond approximately to the clear distance between the corresponding side walls 83, 83' of the adjacent cover boxes 81, 81' in each case or can also be somewhat smaller. Each lateral buffer element 92 is—cf. FIG. 17—constructed as a counter-stop to the stop flange 83c on the corresponding side wall 83 of the smaller cover element 81, and it limits the relative movement of these two adjacent cover elements 81, 81' in the direction of extending the telescopic cover.

By contrast, there is no buffer element provided on the rearward edge 90b of the rigid fixing strip 90 in the region of the top wall 82' of the larger cover box 81', but there is a buffer-free space (clearance) A between the outwardly projecting flange 84a of the material deformation 84 in the top wall 2 of the smaller cover box 81 and this rearward edge 90b of the fixing strip 90 in the fully extended state of the two cover boxes 81 and 81'. For this purpose the width B of the buffer elements 91 on the side walls 82' (viewed in the longitudinal direction of the cover) is kept sufficiently great that in the fully extended state of the two cover boxes which are adjacent to one another in each case a minimum spacing between the rearward edge 90b of the fixing strip 90 and the wall 84a is ensured. This can also be created by a correspondingly large dimension by which the stop flange 83c projects rearwards with respect to the flange 84a.

The arrangement and co-operation of the lateral stop flanges 83c and buffer elements 92 only in the region of the side walls of two cover boxes which are adjacent to one another and co-operate telescopically results in an extremely advantageous and reliable manner in completely tilt-free extension of the cover boxes (cover elements) which are adjacent to one another in each case in a telescopic cover. The guide projections 83d provided on the rearward ends of the side walls of each cover box also contribute to extremely reliable longitudinal guiding.

However, the telescopic cover according to the invention can not only be used for flat or prism-like guideways of machine tools, for which purpose the previously described and essentially trough-shaped cover boxes are intended, but it can also be provided for covering a column, a spindle or the like, particularly of machine tools. In the latter case a column, spindle or the like is then enclosed like a closed telescopic tube by this telescopic cover with appropriately adapted length. The embodiments described below with the aid of FIGS. 18 to 20 serve for this type of cover.

Figure 18:
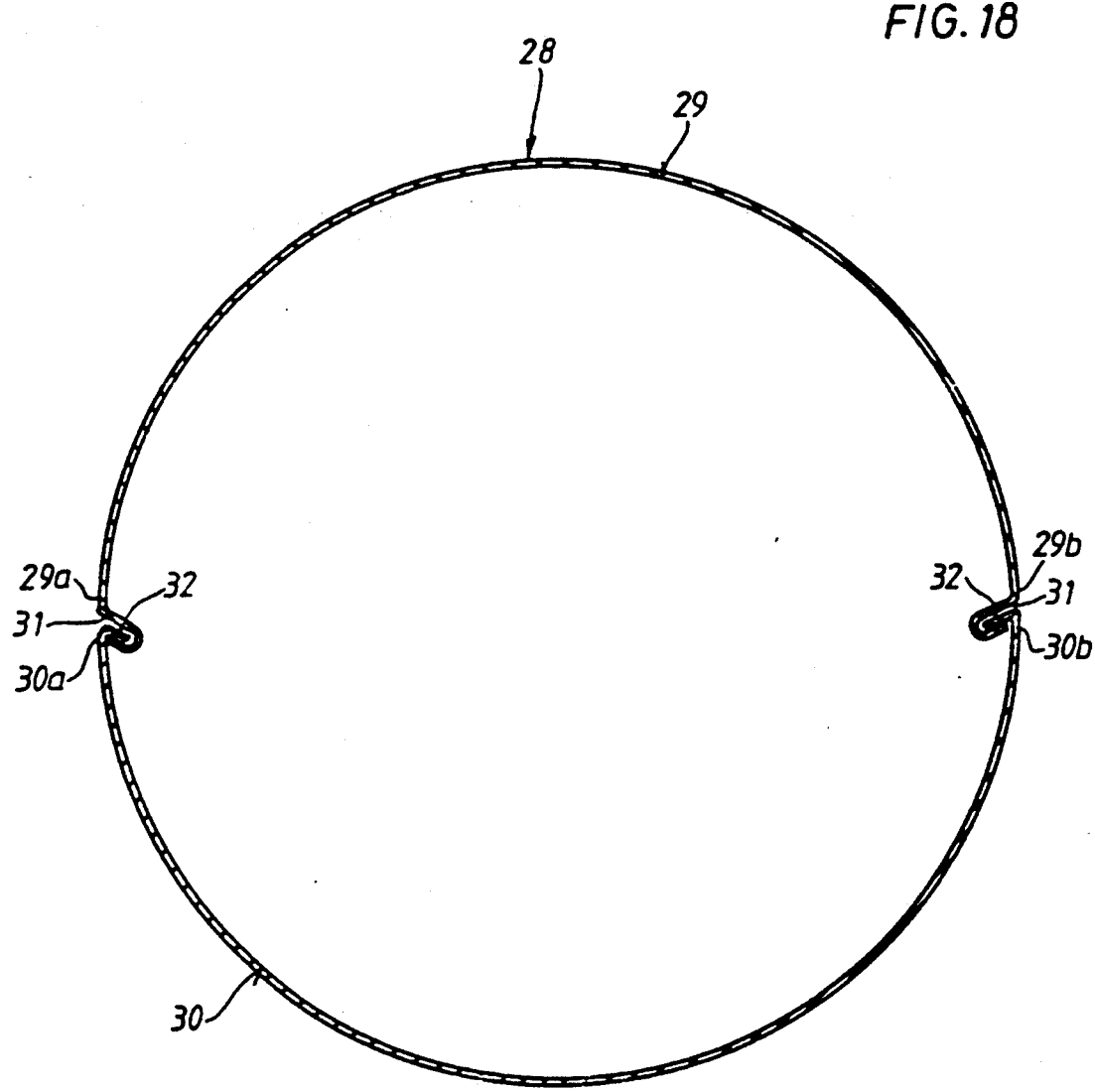
FIG. 18 shows a cross-sectional view through a tubular cover element.

FIG. 18 shows a cross-section through a tubular cover element 28 which surrounds a column, spindle or the like —not shown—in a circular fashion and which is divided into two preferably approximately half cover shells, namely a first half cover shell 29 and a second half cover shell 30. The first half cover shell 29 has on each of its two dividing long edges 29a and 29b a longitudinally extending rib-shaped material deformation which is approximately U-shaped in cross-section and is in the form of a channel 31 which is open towards the outside, whilst the second half cover shell 30 has on each of its two dividing long edges 30a and 30b a longitudinally extending bend 32 which is approximately hook-shaped in cross-section and is bent inwards. The channels 31 which are open towards the outside on the dividing long edges 29a and 29b of the first half cover shell 29 and the hook-shaped bends 32 on the dividing long edges 30a and 30b of the second half cover shell 30 and constructed and arranged in such a way that they fit and engage in one another in a form-locking manner so as to be firm but releasable. It is also advantageous if at least the half cover shell 29 with the U-shaped channels 31 on its dividing long edges 29a, 29b, but optionally both half shells 29, 20, have in the region of their dividing long edges—viewed in the cross-section of the tubular cover element 28—are prestressed in the outward direction, thus ensuring a reliable and inherently stable and thus easily releasable assembly of each element 28 produced in this way.

In the construction described above of a tubular cover element 28, the channels 31 which are open towards the exterior on the dividing long edges 29a, 29b of one half cover shell 29 not only form the engaging elements for the form-locking connection of the two half cover shells 29 and 30 but at the same time they also form a rib-like longitudinal reinforcement of this half cover shell 29 and thus, in the end, of the entire cover element 28. Moreover, it is easy to conceive that all the other tubular cover elements belonging to a complete telescopic cover can be of similar construction, but are merely made correspondingly larger or smaller, above all in diameter, in order to achieve the telescopic construction.

As in the embodiments described above with the aid of FIGS. 1 to 17, in a telescopic cover for a column, spindle or the like according to the example of FIG. 18 it is also possible to provide at least one U-shaped material deformation extending at right angles to the longitudinal direction on at least one end section of each cover element, so that in the case of tubular cover elements the U-shaped material deformation only extends over a sensible partial section of the periphery or over practicable partial sections of the periphery. Such an embodiment will be explained below with the aid of FIGS. 19 and 20.

It will be assumed here for the sake of simplicity that a tubular cover element 28' which is of the same basic construction as in the example of FIG. 18 is used and only adapted appropriately; for this reason only one half shell 29' which corresponds approximately to the half shell 29 in FIG. 18 is illustrated in FIG. 19, whereas FIG. 16 shows a partial longitudinal view (section approximately along the line XX—XX in FIG. 19) of three cover elements 28', 28'a and 28'b which are pushed telescopically into one another.

Referring first of all to the half cover shell 29' of the tubular cover element 28' in FIG. 19, this again shows the longitudinally extending U-shaped material deformations each in the form of channel 31 which is open towards the exterior (the same as in the example of FIG. 18) which are provided on the two dividing long edges 29a' and 29b'.

Referring in addition to the representation in FIG. 20, it will also be seen that each tubular cover element 28', 28'a, 28'b, and particularly the corresponding half cover shell 29', 29'a and 29'b respectively, has on one end (on the lower end in each case in FIG. 20) an end flange 33, 33a, 33b running transversely and directed (bent) inwards approximately at right angles, and on its opposite end (the upper end in each case in FIG. 20) has several short material deformations 34 which are distributed over the periphery, run transversely and are U-shaped in cross-section and which are all of the same construction and the same size and form a channel 35 which is open towards the interior. The length of each material deformation 34 in the peripheral direction of the appertaining cover element is chosen so that the desired U cross-section can be easily achieved by suitable deformation (e.g. multiple bending) of a corresponding integral flap on the end of the cover element. According to the embodiment in FIG. 19, each half shell 29', 29'a, 29'b can have for instance three material deformations 34 evenly distributed over the periphery. All U-shaped material deformations 34 on the corresponding cover element 28', 28'a, 28'b can—exactly as in the preceding examples—be constructed to received an appertaining rear wall 36, 36a or 36b respectively, as indicated in FIG. 20, these rear was being received in the channels 35 of the material deformations 34 which are adapted to their width. These U-shaped material deformations 34 can also of course—additionally or alone—form an extension limiting stop in co-operation with the corresponding end flange 33, 33a. . . of the succeeding cover element and/or can serve to receive suitable slides or the like.

In all the embodiments described the cover elements and their parts can be produced entirely from sheet metal or plastic or from a sensible combination of these materials. It should also be emphasised again that the material deformation of each cover element can also be constructed with quite a narrow U-shaped cross-section, i.e. to some extent pressed together or flattened, and can optionally also be equipped with sealing material and at some points can even be laid flat, above all in each case when this material deformation is designed as reinforcement for the appertaining surface. Above all in the case of particularly high side walls of trough-shaped or channel-shaped cover elements, these side walls can also have corresponding material deformations. The cover elements themselves can be of any suitable and advantageous cross-sectional shape in order to adapt them particularly favourably to the cross-section of the part to be protected.

In the tests on which the invention is based it has proved particularly advantageous if the material deformations of U-shaped cross-section are produced by multiple bending from the prepared rough sheet material blank in such a way that a type of pre-bending edge of a bending machine initially acts on the base which is to be formed of a channel to be formed by the U-shaped material deformation and carries out a pre-shaping in such a way that the lateral parts (wall sections) which lie opposite one another of the finished channel or material deformation are initially bent only to such an extent that they enclose an angle of approximately 30°. Then a strip or sheet, the material thickness of which corresponds to the internal width of the finished channel, is placed upright between these two opposing parts and on the base of the channel to be formed, whereupon the two opposing parts are pressed against the side walls of the inlaid sheet strip (with simultaneous pressure of the sheet strip on the base of the channel). When the lateral bending pressure on the parts is stopped then these two parts spring back slightly, so that the inlaid sheet strip can be removed without problems. This results in multiple bending with relatively true measurements which can be produced extremely quickly for the production of the U-shaped material deformations.

We claim:

1. For use on a machine tool which, when in operation, generates waste materials, a telescopic cover assembly comprising a plurality of cover elements each including opposed side walls and a top wall spanning between said opposed side walls an having inner surfaces to define an interior space for enclosing the machine tool, consecutive ones of the cover elements being sized and shaped to nest within an immediately preceding cover element whereby said cover elements can be moved telescopically with respect to one another to expose the machine tool, each one of said cover elements being formed from a single sheet material blank, at least one of said cover elements having at least one transversely extending material deformation having an open U-shaped cross-section in its opposed side walls and top wall which opens toward the interior space defined by the cover element and formed by multiple bends in said cover element to form a concave recess for receiving and supporting a partition wall, whereby the opposed sidewalls and top wall can receive and support the edges of the partition wall, and wherein at least one of said cover elements has a partition wall forming a rear partition wall and wherein said material deformation projects toward the exterior surface of the cover element and said concave recess receives and holds said rear partition wall.

2. The telescopic cover assembly as claimed in claim 1 wherein a second material deformation is formed in said at least one of said cover elements and located immediately adjacent said one material deformation and projects at least partially toward the interior space of the cover element to form a second concave recess, said second concave recess being open towards the exterior of said cover element and forming a discharge channel for receiving the waste materials.

3. A telescopic cover, particularly for use with a machine tool having an elongated guideway, and which, in operation, generates waste materials, said telescopic cover adapted to extend longitudinally along the guideway of the machine tool and comprising a plurality of cover elements each including a front and a rear end, each cover element having a top wall and first and second opposed side walls defining exterior and interior surfaces on said walls and being approximately in the form of an inverted trough, each cover element being formed from a single sheet material blank with said first and second side walls bent at an angle to the top wall, at least one end of said sheet material blank having cut-outs of a shape and size so that at least some cut out edges butt against one another to form a corner connection in the finished cover element, at least one U-shaped material deformation extending at right angles to the longitudinal direction at an end section of each cover element to form an open channel which extends at least over partial sections of said top wall and said first and second side walls of said cover element, said one U-shaped material deformation projecting toward the interior of its cover element to form a U-shaped channel which is open towards the exterior and said sheet material blank forming a transition region from the top wall to at least one of said side walls having said one U-shaped material deformation formed by multiple bends in said sheet material blanks, wherein said top wall of the cover element has formed therein substantially centrally of said top wall a ridge-like kink extending in the longitudinal direction of the cover and said sheet material blank has a second material cut-out on the end of said top wall having said U-shaped material deformation, in the region of said U-shaped channel.

4. A telescopic cover, particularly for use with a machine tool having an elongated guideway and a spindle, and which, in operation, generates waste materials, said telescopic cover adapted to extend longitudinally along the guideway of the machine tool and comprising a plurality of cover elements each including spaced front and rear ends and including at least one wall having exterior and interior surfaces, wherein said cover elements can be moved telescopically towards one another, wherein each consecutive cover element is smaller than and adapted to fit slidably within its adjacent cover element, at least one of said cover elements having at least one material deformation in the said one wall forming a rib with a U-shaped cross-section formed by multiple bends in said one wall of said cover element, each of said cover elements being tubular and comprising two half cover shells having longitudinal edges, one of said cover shells having on each of its longitudinal edges a longitudinally extending one of said U-shaped material deformations forming a channel which is open towards the exterior and the other half cover shell has on each of its longitudinal edges a longitudinally extending bend having an approximately hook-shaped cross-section bent toward the interior, said U-shaped material deformations and said hook shaped bends being adapted to engage one another in a form-locking manner, and at least one half cover shell having said U-shaped material deformations prestressed in the outward direction in the region of its longitudinal edges, wherein each tubular cover element has on its front end an end flange extending transversely and directed towards the interior of said cover element, and has at its rear end a plurality of short material deformations around the periphery thereof which are U-shaped in cross-section extending toward the exterior and transversely, and which are adapted to receive and hold within the U-shape a rear wall for the cover element and which form an extension limiting stop in cooperation with the said end flange of an adjacent cover element.

5. A telescopic cover, particularly for machine tools, comprising several cover elements of similar shape and progressively larger sizes which are adapted to be moved telescopically towards one another, at least one of said cover elements comprising a single sheet material blank having multiple bends therein and having interior and exterior surfaces, a top wall and opposed side walls and frontward and rearward ends, said one of said cover elements having a flange-like section formed by bends in said sheet material blank and projecting above the plane of the top wall for forming a stop element for abutment against the adjacent larger cover element, characterized by:

the rearward end of at least one of said cover elements having a U-shaped material deformation which runs at right angles to the longitudinal direction of movement of said cover element and which projects into the interior of said cover element forming a channel which extends continuously over said top wall and said opposed side walls, said U-shaped channel including along said top wall a rearward upwardly extending leg, said rearward leg of said U-shaped channel being formed by said flange-like section, said sheet material blank having, in the region of said U-shaped material deformation in the transitional regions from the top wall section to the opposed side wall sections a material cut-out having edges of corresponding size and shape, said edges, after bending of said sheet material blank, being adapted to butt against one another and to be welded together along the abutting edges.

* * * * *